United States Patent [19]
Torpey et al.

[11] 3,932,273
[45] Jan. 13, 1976

[54] METHOD FOR THE PRIMARY AND SECONDARY TREATMENT OF WASTEWATER IN A UNITARY APPARATUS

[75] Inventors: Wilbur N. Torpey, Douglaston; Richard A. Sullivan, Woodside, both of N.Y.

[73] Assignee: Autotrol Corporation, Milwaukee, Wis.

[22] Filed: Nov. 14, 1974

[21] Appl. No.: 523,701

Related U.S. Application Data

[63] Continuation-in-part of Ser. No. 386,860, Aug. 9, 1973, Pat. No. 3,849,304.

[52] U.S. Cl. ................................. 210/17; 210/151
[51] Int. Cl.² .......................................... C02C 1/04
[58] Field of Search ..................... 210/9, 14–17, 210/150, 151

[56] References Cited
UNITED STATES PATENTS

| | | |
|---|---|---|
| 1,991,896 | 2/1935 | Hays .................................... 210/17 |
| 3,466,241 | 9/1969 | Simpson ............................... 210/17 |
| 3,703,462 | 11/1972 | Smith ................................ 210/17 X |
| 3,776,841 | 12/1973 | Torpey ................................. 210/17 |
| 3,849,304 | 11/1974 | Torpey et al. ......................... 210/14 |

*Primary Examiner*—Charles N. Hart
*Assistant Examiner*—Robert H. Spitzer
*Attorney, Agent, or Firm*—Quarles & Brady

[57] ABSTRACT

A method utilizing a composite apparatus for the treatment of wastewater to remove settleable and floatable solids and to remove and oxidize organic matter including a treatment tank having at least two horizontally adjacent bays, each of the bays having an upper biological treatment zone separated by a horizontally disposed baffle from a lower settling zone. Raw wastewater enters the lower settling zone of one of the bays wherein settleable and floatable solids are removed, and then turns vertically to flow in a reverse direction through the upper biological treatment zone of each bay. From the upper treatment zones the wastewater is directed into and through the lower settling zone of the second bay from which the treated fluid is removed.

8 Claims, 5 Drawing Figures

METHOD FOR THE PRIMARY AND SECONDARY TREATMENT OF WASTEWATER IN A UNITARY APPARATUS

RELATED APPLICATIONS

This application is a continuation-in-part of copending application Ser. No. 386,860 filed Aug. 9, 1973, now U.S. Pat. No. 3,849,304.

BACKGROUND OF THE INVENTION

The invention pertains to the treatment of wastewater to remove pollutants. More specifically, the invention provides method and apparatus for the physical treatment of wastewater to remove particulate matter and biological treatment for the removal of organic material. The present invention employs rotating partially submerged biological contactors to grow aerobic biological slimes for the oxidation of organic pollutants and settling zones subjacent to the contactors for removal of both the raw primary and secondary solids generated by the biological treatment from the wastewater.

U.S. Pat. No. 3,575,849 issued to Torpey discloses a method and apparatus for biologically treating wastewater including a treatment tank having a biological treatment zone in its upper portion and a quiescent settling zone in its lower portion. The biological treatment zone includes a plurality of parallel rotatable shafts disposed across the upper portion of the tank; each of the shafts supporting a plurality of biological contactors, typically thin discs. The contactors extend into the wastewater in the tank to less than half the tank depth, providing a subjacent settling zone for sloughed off solids. The surface of the biological contactors is alternately exposed to the atmosphere and immersed in the wastewater at suitable intervals to promote the growth of aerobic biological slimes.

The U.S. Pat. No. 3,776,841 issued Dec. 4, 1973 to Torpey, discloses a wastewater treatment tank having an upper biological treatment zone including rotating partially submerged contactors to grow aerobic biological slimes and a subjacent settling zone. The subjacent settling zone is physically separated from the biological treatment zone by a false bottom or longitudinal baffle. Wastewater is introduced into the upper biological treatment zone, flows through the upper zone, around the longitudinal baffle and into and through the subjacent settling zone to a treated wastewater outlet.

The U.S. Pat. No. 3,563,383 to Hellquist, pertains to a method for treating organically polluted wastewater including biological treatment using partially submerged contactors in the upper portion of a section of the treatment unit. The Hellquist system separates primary from secondary treatment as it utilizes a plurality of separate bays arranged in series for primary settling before the wastewater enters the biological treatment section.

SUMMARY OF THE INVENTION

The present invention provides a treatment tank having facilities for removing raw settleable and floatable matter from wastewater, biologically treating the wastewater and subsequently removing the sloughed off biological slimes from the treated wastewater. The new method maximizes biological treatment in a tank of a predetermined volume resulting in BOD removals of up to 98% while utilizing the lower portions of the tank for the removal of both primary and secondary solids.

The new treatment tank, which can be, and preferably is, an existing settling tank modified in accordance with the invention, has at least two, and preferably three or more, horizontally adjacent bays. Each bay includes an upper biological treatment zone employing rotating partially submerged contactors and a subjacent zone substantially coextensive with the upper zone.

A horizontally disposed baffle is located in each bay immediately below the contactors to physically separate each bay into vertically adjacent settling and biological treatment zones.

In accordance with a specific aspect of the invention, one of the horizontally adjacent bays, preferably the center one of a three bay facility is supplied with raw untreated wastewater, typically normal domestic wastewater. The influent enters the lower settling zone at one end of this bay, hereinafter referred to as the primary bay, wherein primary treatment is effected by sedimentation. The wastewater flows through the lower zone of the primary bay, and upwardly around the longitudinal baffle, at which point it is split horizontally with a portion of the wastewater being supplied to the upper biological treatment zone of the secondary bay or bays and the remaining portion to the upper biological treatment zone of the primary bay. Preferably, the wastewater is split into a number of substantially equal portions corresponding to the number of bays. The wastewater flows through the primary and secondary upper zones wherein soluble pollutants are oxidized by the aerobic slimes that grow and are maintained on the rotating contactors. After flowing through the upper zones of the bays, the effluent partially treated wastewater is folded vertically around the horizontal baffles of the secondary bays and introduced into the lower settling zone of the secondary bay or bays adjacent to the primary bay. The wastewater from the upper treatment zone of the primary bay is directed into the secondary bay or bays, combined with the wastewater from the upper treatment zone of that bay, and is vertically folded into the lower settling zone of the secondary bay. The wastewater flows through the secondary settling zones wherein residual solids, primarily mature slimes soughed off from the contactors, are removed from the wastewater. The wastewater after passing through the secondary settling zones is withdrawn from the end of the tank opposite the end in which the wastewater was initially introduced. When the primary bay is the center unit of a three bay installation, the effluent flow from the biological treatment zone of the primary bay is split into two substantially equal portions, each of which is supplied to a secondary bay and folded vertically into the lower settling zone of that bay along with the wastewater flow from each of the secondary biological treatment zones.

DESCRIPTION OF PREFERRED EMBODIMENTS

Figure 1:
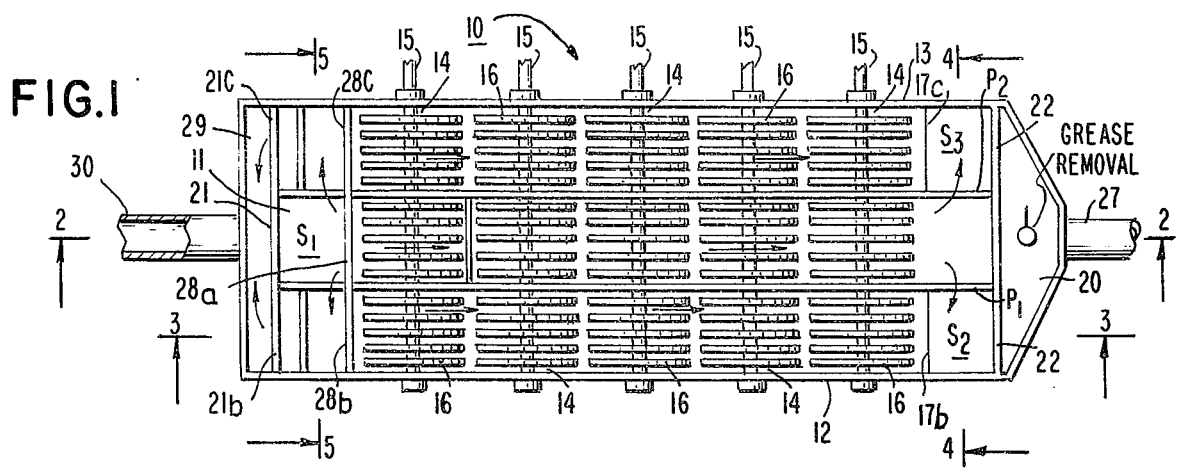
FIG. 1 is a plan view of a treatment tank according to the invention.
Figure 2:
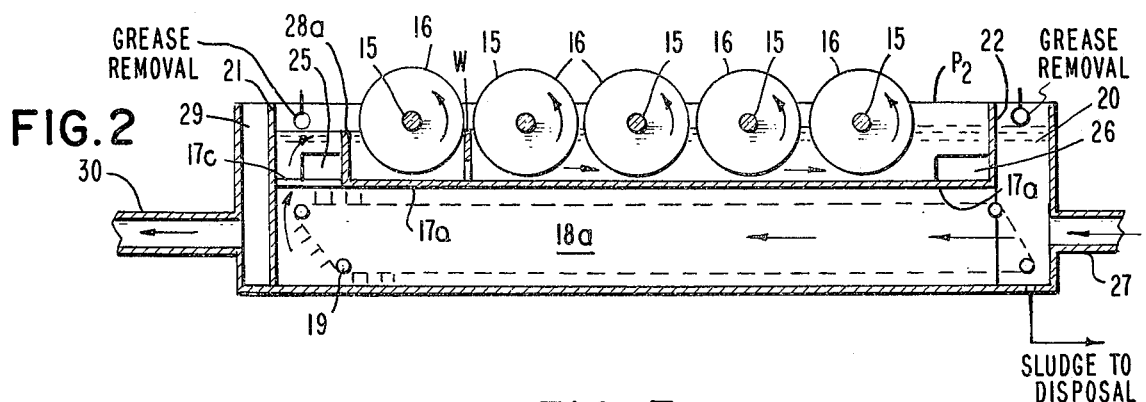
FIG. 2 is a cross-sectional elevation view taken along line 2—2 of FIG. 1.
Figure 3:
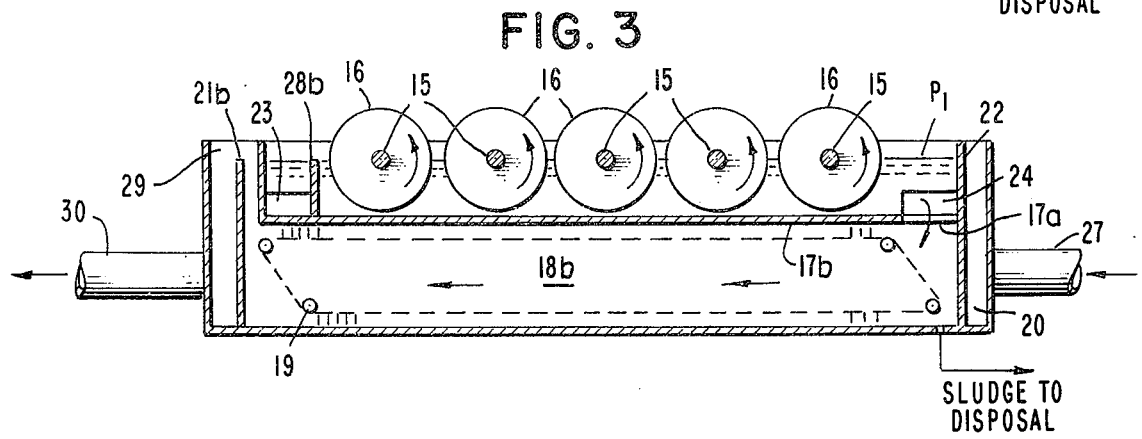
FIG. 3 is a cross-sectional elevation view taken along line 3—3 of FIG. 1.

Referring to the drawing, a three bay treatment tank 10 embodying the principles of the invention is shown. The treatment tank 10 is composed of a central or primary bay 11 and a pair of secondary bays 12 and 13 that are horizontally adjacent to bay 11 and separated therefrom by partitions $P_1$ and $P_2$. Each of the bays 11, 12 and 13 includes an upper biological treatment zone including a plurality of parallel biological contactor assemblies 14, which include a plurality of contactors 16 concentrically and fixed mounted on rotatable shafts 15. The contactors 16 provide surface area upon which biological slimes may grow. The shafts 15 are preferably mounted above the usual level of wastewater in the tank unit to simplify mechanical construction although submergence of the contactors 16 can be varied from about one-third to two-thirds of their diameter. FIG. 1 of the drawing shows a common shaft 15 for each bank of contactors extending across the three bays of tank 10. This arrangement simplifies the driving of the shafts to rotate the contactors and since the wastewater flow is in the same direction in all of the upper biological treatment zones, permits the contactors to be rotated in the direction of wastewater flow as shown by the arrows of FIGS. 2 and 3. Alternatively, each of bays 11–13 can have independent contactor shafts that are rotated by separate driving means to rotate the separate banks of contactors in any desired direction.

Although the rotatable biological contactors of the invention may take different forms such as drums, cylinders, brushes or thin, closely spaced discs, it is preferred to use contactors having a discontinuous honeycomb type structure such as that disclosed in pending U.S. application Ser. No. 252,038 filed May 10, 1972, now U.S. Pat. No. 3,827,559. Thin discs are also advantageous biological contactors since they facilitate a high concentration of surface area per unit volume of biological treatment zone and can be used to impart a mixing and pumping effect to the wastewater. Suitable biological contactors can be constructed of many available materials, although plastics are generally preferred.

As previously mentioned, driving means (not shown) are provided to rotate shafts 15 to impart a predetermined peripheral velocity to the contactors 16. Advantageously, the driving means are capable of imparting rotational forces to shafts 15 variable in magnitude and direction. This allows for the accommodation of varying wastewater flow rates through the tank 10 and provides for the mechanical removal of excessive slime growth from the surface of contactors 16 when and if desired. Preferably, the directional component of the peripheral velocity of the discs at their lowermost portion is in the direction of wastewater flow through the biological treatment zone of each bay.

Each of the bays 11, 12 and 13 is divided into two vertically adjacent treatment zones, physically separated by longitudinal baffles 17a, b and c. The upper portion of each bay, which encompasses the rotating contactor assemblies 14 is operated to perform the biological treatment function. The lower portion of each bay between the baffles 17a, b and c and the bottom of the tank is a subjacent sedimentation zone, generally indicated by the numbers 18a, b and c. Typically, a sludge collection mechanism 19 is provided at the bottom of each bay to transport the settled sludge to one end of the tank from which it is withdrawn and subsequently disposed of (not shown). The sludge collection mechanism can be chosen from those presently in widespread use.

In accordance with a specific aspect of the invention, the longitudinal baffles 17a, b and c, which form a false floor for each of the upper biological treatment zones, extends across the full width of each of bays 11, 12, and 13 and along a substantial portion of the long dimension of the tank. A sufficient space $S_1$ is provided between the end of the baffle 17a and the tank wall 21 to permit the wastewater to pass vertically and then reverse direction and flow from the lower settling zone 18a of bay 11 to the upper biological treatment zones of bay 11, 12 and 13. Similar spaces $S_2$ and $S_3$ are provided between the ends of baffles 17b and c and the end wall 22 of tank 10 to permit the wastewater to pass downwardly and reverse direction and flow from the upper biological treatment zones of bays 11, 12 and 13 and into the lower settling zones 18b and c. The upward or downward velocity of the wastewater as it flows from zone to zone should be from about 3 to 15 feet per minute. In all three bays, the wastewater should travel through the settling zone countercurrently to the flow direction through the upper biological treatment zone of that bay.

Ports 23 and 25 are cut out of partitions $P_1$ and $P_2$ to permit the wastewater passing upwardly from settling zone 18a to subsequently flow horizontally into the upper biological treatment zone of bay 12 (port 23) and bay 13 (port 25). Similar ports 24 and 26 are provided at the other end of partitions $P_1$ and $P_2$ to permit wastewater from the upper biological treatment zone of bay 11 to pass into spaces $S_2$ and $S_3$ and flow downwardly into the lower settling zones 18B and C of bays 12 and 13.

The primary bay 11 is shown in further detail in FIG. 2. Raw wastewater enters one end of the tank 10 and into the lower settling zone 18a of bay 11 through inlet conduit 27 and chamber 20 and flows beneath longitudinal baffle 17a as indicated by the arrows. Particulate organic matter as well as sand and other solids materials are removed from the wastewater in the lower settling zone 18a, by sedimentation and transported along the tank bottom by the collection mechanism 19 to chamber 20 from which it is removed. Collection mechanism 19 preferably includes flights that scrape grease or other foreign matter from the bottom of the longitudinal baffles as well as from the tank bottom of each bay. After passing through the primary settling zone 18a, the wastewater flows upward through the space $S_1$ and is split into three streams; one stream for each of the upper biological treatment zones of each of the bays 11, 12 and 13. One stream passes through port 23 and into the biological treatment zone of bay 12 over weir 28b, another through port 25 and into the biological treatment zone of bay 13 over weir 28c and the third stream reverses direction around longitudinal baffle 17a and flows into the biological treatment zone of the primary bay 11 over weir 28a. If more than three bays are present, the wastewater is split into a number of streams equal to the number of bays and a stream is directed to the upper biological treatment zone of each bay. Preferably, the wastewater flow is split into equal streams after passing through the lower settling zone of the primary bay.

Figure 4:
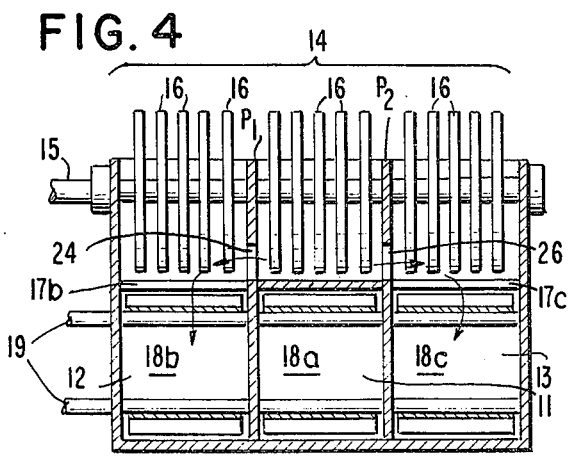
FIG. 4 is a cross-sectional elevation view taken along the line 4—4 of FIG. 1.
Figure 5:
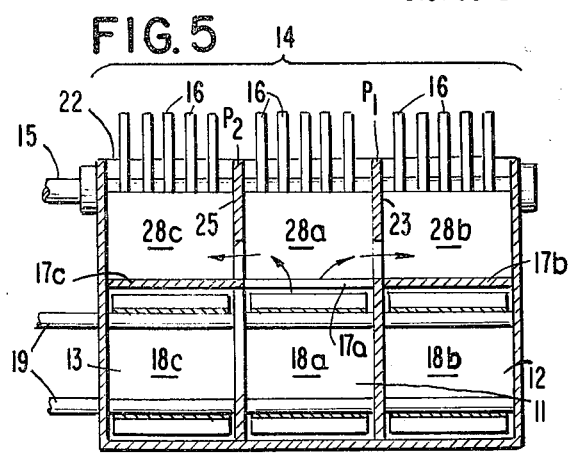
FIG. 5 is a cross-sectional elevation view taken along the line 5—5 of FIG. 1.

The wastewater flows through the biological treatment zone of the bays 11–13 wherein organic pollutants are oxidized thus furnishing the nutritional energy for the growth and maintenance of the biological slimes on the surface of contactors 16. Upon reaching the end of the biological treatment zones of the bays, the wastewater flow is directed as indicated by the arrows in FIGS. 1, 3 and 4 into the lower settling zones 18b and c of bays 12 and 13. The wastewater from the upper biological treatment zone of bay 11 is split horizontally into two streams; one of which passes through port 24 to combine with the biologically treated wastewater from the upper zone of bay 12 and the other passes through port 26 to combine with the biologically treated wastewater from the upper zone of bay 13. Each of the combined streams are vertically folded around longitudinal baffles 17b and c respectively, through spaces $S_2$ and $S_3$ and into the lower settling zones 18b and c. The biologically treated wastewater from the upper zone of bay 11 is split into a number of streams equal to the number of secondary bays, i.e., one less than the total number of bays, prior to being combined with the biologically treated wastewater from the upper zones of the secondary bays. Preferably the biologically treated wastewater from the upper zone of the primary bay is split into an appropriate number of equal streams.

The combined wastewater streams flow through lower settling zones 18b and c wherein remaining solids and mature slimes that have sloughed off the contactors 16 are removed from the wastewater by sedimentation. Accumulated solids in the lower settling zones 18b are transported by collection mechanisms 19, to sludge disposal. Sludge mechanism 19 includes a driven chain having flights projecting therefrom. The flights are adapted to scrape the bottom of longitudinal baffles, 17a, b, c as well as to transport settled solids along the bottom of each bay to an appropriate withdrawal point. Grease accumulation will be in chamber 20 and area $S_1$. Suitable grease removal means should be provided at each of these locations. After passing through the lower settling zones 18b and c the wastewater enters outflow chamber 29 over weirs 21b and 21c from which it is removed through conduit 30.

Weirs W can be provided between each bank 14 of contactors in each of bays 11–13 to obtain the desired staging effect. Weirs W have a cut out portion along their bottom to prevent solids settled in the biological treatment from being trapped between stages of contactors. Although only a single weir W is shown in the drawing for the sake of clarity, in practice it is preferred to provide a weir W between each bank of contactors 14 in each of bays 11–13.

Although it is preferred to utilize three bays in practicing the invention, i.e., a primary bay and a secondary bay adjacent each side of the primary bay, it is within the scope of the invention to utilize more than three bays as previously discussed or only a two bay tank. The primary bay of a two bay unit would function as the bay 11 of the above-described unit, while the second bay would be the equivalent of either of bays 12 or 13. To compensate for the possible lack of sufficient sedimentation area in the lower settling zone of the secondary bay of a two bay unit, a downstream clarifier or micro-screening unit may be provided to remove carried over solids.

It is preferred to limit the immersion depth of contactors 16 to less than one half the depth of the bays. For practical purposes the diameter of contactors 16 will be between about 6 to 15 feet and immersion depth less than half of the diameter.

To encourage the growth of biological slimes by alternately immersing them in the wastewater and exposing them to the atmosphere, the contactor assemblies 14 are rotated at a suitable predetermined velocity. From a practical standpoint, the peripheral velocity of the discs should not exceed about 1 foot per second, and must be sufficiently high to avoid excessive time of immersion of the biological slimes. To provide the microorganisms in the slime with oxygen sufficient to satisfy their metabolic processes, the immersion time of the slime typically should not exceed about 10 seconds in the first stage of treatment. As the wastewater becomes progressively clarified the immersion time of the slimes can be increased gradually to about 30 seconds. For smaller diameter contactors the peripheral velocity can be reduced substantially while avoiding excessive immersion time, while the larger diameter contactors usually require that the rotational velocity be substantially increased to avoid excessive immersion time. Therefore, the peripheral velocity of the contactors 16 for normal operation should be about 0.5 to 1 foot per second.

The method and apparatus of the invention provides a relatively inexpensive and practical means for substantially upgrading wastewater treatment plants. The invention can be applied to primary sedimentation tanks, which were designed to remove only the settleable solids from the raw wastewater and can be modified to provide biological treatment and secondary settling in addition to their original function.

The invention provides an upgrading scheme that has the wastewater inlet and outlet conduits on opposite ends of the tank, as they would be in existing settling tanks. As a result of this disposition of the influent and effluent conduits existing settling tanks can be upgraded to provide for the complete treatment of wastewater, i.e., primary settling, biological treatment and secondary settling with minimal, if any, piping changes and at a moderate capital cost. Primary treatment plants that are presently removing about 30% of the $BOD_5$ in the wastewater can be upgraded economically to remove from 80–90% of $BOD_5$ by applying the principles of this invention to the plant.

The removal of carbonaceous pollutants is a function of the loading rate, e.g., gal/day/sq.ft of contactor area and the strength of the wastewater measured in terms of $BOD_5$. A 90% $BOD_5$ removal can be effected with a loading rate of 2 to 5 gal/day/sq.ft of contactor surface for normal wastewater and 80% BOD removal with a loading rate from 4 to 10 gal/day/sq.ft. When an oxygen enriched atmosphere is provided above the biological treatment zone, i.e., about 40–70% oxygen, 90% $BOD_5$ removal can be accomplished with a loading rate from 4 to 10 gal/day/sq.ft.

In addition to substantially upgrading existing wastewater treatment plants, the method and apparatus of the invention can be the basis for new plant design. A single tank wastewater treatment plant capable of removing over 90% of BOD from wastewater can be provided at a fraction of the cost of a conventional activated sludge or a trickling filter plant effecting the same degree of clarification.

It should be understood that the method and apparatus of the invention have been described in relation to specific applications for illustrative purposes only. The term longitudinal baffle should read to include any horizontally disposed baffle that folds the wastewater flow between a biological treatment zone and a subjacent settling zone. Variations and modifications of the examples can be made without departing from the clear teachings and spirit of the invention. Accordingly, reference should be made to the following appended claims to determine the full scope of the invention.

We claim:
1. Method for the continuous treatment of wastewater comprising
   a. providing a treatment tank having a primary bay and at least one secondary bay horizontally adjacent to said primary bay,
   b. each of said bays including a lower settling zone and a vertically adjacent upper biological treatment zone including means for biologically treating wastewater to oxidize pollutants,
   c. introducing wastewater into the lower settling zone of said primary bay at one end of said tank,
   d. creating a flow of wastewater through the settling zone of said primary bay in a direction away from said one end,
   e. dividing wastewater from the settling zone of said primary bay into at least two portions
   f. creating a flow of one of said portions through the biological treatment zone of said secondary bay,
   g. creating a flow of another of said portions through the biological treatment zone of said primary bay,
   h. said portions of wastewater flowing through said biological treatment zones in parallel and toward said one end of said tank,
   i. directing wastewater from the biological treatment zone of said primary bay to the settling zone of said secondary bay,
   j. directing wastewater from the biological treatment zone of said secondary bay to the settling zone of said secondary bay,
   k. creating a flow of wastewater from the biological treatment zones of each of said primary and secondary bays through the settling zone of said secondary bay in a direction away from said one end of said tank and countercurrent to the direction of wastewater flow through the upper biological treatment zone of said secondary bay, and
   l. removing treated wastewater from the settling zone of the secondary bay at the end of said tank opposite said one end.

2. The method of claim 1, wherein said primary bay is disposed between two secondary bays, each of said secondary bays being horizontally adjacent to said primary bay.

3. The method of claim 2, wherein said wastewater is divided into at least three substantially equal portions after passing through the settling zone of said primary bay, each of said portions being directed to the biological treatment zone of one of said bays.

4. The method of claim 1, wherein each of said biological treatment zones includes a plurality of partially submerged rotatable contactor members having surface suitable for the growth of aerobic biological slimes.

5. The method of claim 4, wherein said surface is disposed parallel to the direction of wastewater flow through said biological treatment zones.

6. The method of claim 4, wherein said contactor members are rotated at a peripheral velocity adequate for the growth and maintenance of aerobic biological slimes.

7. The method of claim 1, wherein said wastewater is vertically directed from the lower settling zone to the biological treatment zone of said primary bay and from the biological treatment zone of said secondary bay to the lower settling zone of said secondary bay by a longitudinal baffle disposed between said settling and biological treatment zones across the width of each of said bays and along a substantial portion of the length of each of said bays.

8. The method of claim 1, including at least two secondary bays, wherein wastewater is divided into at least three substantially equal portions after passing through the settling zone of said primary bay, and said another portion of wastewater is subsequently divided into at least two substantially equal portions after passing through the biological treatment zone of said primary bay.

* * * * *